United States Patent [19]
Hozumi

[11] Patent Number: 5,666,440
[45] Date of Patent: Sep. 9, 1997

[54] METHOD AND APPARATUS FOR EXTRACTING OUTLINE DATA FROM BI-LEVEL IMAGE DATA

[75] Inventor: Yoshiko Hozumi, Zushi, Japan

[73] Assignee: Victor Company of Japan, Ltd., Yokohama, Japan

[21] Appl. No.: 589,072

[22] Filed: Jan. 23, 1996

Related U.S. Application Data

[63] Continuation of Ser. No. 300,109, Sep. 2, 1994, abandoned, which is a continuation of Ser. No. 921,167, Jul. 29, 1992, abandoned.

[30] Foreign Application Priority Data

Jul. 31, 1991 [JP] Japan .................................. 3-214715
Jul. 31, 1991 [JP] Japan .................................. 3-214716

[51] Int. Cl.$^6$ .................................................. G06K 9/48
[52] U.S. Cl. ............................................ 382/198; 382/316
[58] Field of Search .................................. 382/198, 316

[56] References Cited

U.S. PATENT DOCUMENTS

| | | | |
|---|---|---|---|
| 3,899,771 | 8/1975 | Saraga et al. | 382/21 |
| 4,773,098 | 9/1988 | Scott | 382/21 |
| 4,833,721 | 5/1989 | Okutomi et al. | 382/21 |
| 4,956,869 | 9/1990 | Mikatake et al. | 382/22 |
| 5,018,216 | 5/1991 | Kojima | 382/22 |
| 5,182,777 | 1/1993 | Nakayama et al. | 382/21 |
| 5,195,147 | 3/1993 | Ohta | 382/21 |

FOREIGN PATENT DOCUMENTS

| | | |
|---|---|---|
| 62-131382 | 6/1987 | Japan . |
| 1-68889 | 3/1989 | Japan . |
| 64-91176 | 4/1989 | Japan . |
| 1-92795 | 4/1989 | Japan . |

*Primary Examiner*—Leo Boudreau
*Assistant Examiner*—Chris Kelley
*Attorney, Agent, or Firm*—Lowe, Price, LeBlanc & Becker

[57] ABSTRACT

A bi-level image is represented by an array of pixels. Code words are generated which represent outline tracing directions defined at points between the pixels respectively. The outline tracing directions represented by the code words are determined in accordance with states of the pixels surrounding and adjoining the related points respectively. A movement from one of the points to another being one of neighboring points is performed in accordance with the outline tracing direction represented by the code word defined at the one of the points. The movement-performing is repeated to trace an outline of a region in the bi-level image. Data representing the traced outline is generated in accordance with addresses of the points along which the movements are performed.

18 Claims, 17 Drawing Sheets

| COLUMN: | 1' | 2' | 3' | 4' |
|---|---|---|---|---|
| ROW: 1' | 0000 | 0000 | 0000 | 0000 |
| 2' | 0000 | 1000 | 1000 | 1000 |
| 3' | 0000 | 0100 | 0000 | |

METHOD AND APPARATUS FOR EXTRACTING OUTLINE DATA FROM BI-LEVEL IMAGE DATA

This application is a continuation of application Ser. No. 08/300,109 filed Sep. 2, 1994, abandoned under 37 CFR 1.62, which is a continuation of application Ser. No. 07/921,167 filed Jul. 29, 1992 abandoned under 37 CRF 1.62.

BACKGROUND OF THE INVENTION

1. Field of the Invention

This invention relates to a method of extracting outline data from bi-level image data. This invention also relates to an apparatus for extracting outline data from bi-level image data.

2. Description of the Prior Art

Image scanners convert printed characters on a sheet into corresponding image information. There are various ways of extracting data representative of outlines of the characters from the image information.

Some printers and computers have ROMs storing data representative of character dot patterns. For enlarging and reducing such character patterns, it is known to extract outline data from character data and to convert the outline data into outline font data.

Japanese published unexamined patent applications 62-131382 and 64-91176 disclose similar methods of extracting outline data from bi-level (black-white) image data. In the methods of Japanese applications 62-131382 and 64-91176, input bi-level image data is expanded twice in each of vertical and horizontal directions, and then a decision is made as to whether data of pixels are black ("1") or white ("0"). This decision is to find a point (pixel) from which tracking and tracing an outline of a black region is started. After such a starting pixel is found, 8 pixels neighboring the starting pixel are checked to detect a direction along which a 0-to-1 change in pixel data is present. Movement along the detected direction corresponds to tracing a fragment of the outline. Successive execution of such movements will complete tracing the entire outline. Specifically, the methods of Japanese applications 62-131382 and 64-91176 enable tracing the outline which connects the centers of pixels extending along the boundary between a black region and a white region.

The methods of Japanese applications 62-131382 and 64-91176 have the following problems. Since input bi-level image data is expanded twice in each of vertical and horizontal directions and then an expanded (larger) quantity of image data is processed, a large-capacity memory is necessary and a long time is spent in processing image data. Since the outline connecting the centers of pixels extending along the boundary between a black region and a white region is traced, a positional error tends to occur between the outline in an original image and the outline in a reproduced image resulting from the processing of the original image. Since a check to detect a direction related to a 0-to-1 change is periodically executed many times, a large number of processing steps is necessary and a long time is spent in the data processing.

Japanese published unexamined patent application 64-68889 discloses a method of detecting right-angled points in an outline of a black region. Specifically, the method of Japanese application 64-68889 uses a sequence of chain code words which represents the outline connecting the centers of pixels extending along the boundary between a black region and a white region. Analyzing the sequence of chain code words decides bending conditions of the outline of the black region so that right-angles points in the outline can be detected. Pixels neighboring the right-angled points are selected as vector points.

The method of Japanese application 64-68889 has the following problem. In the case of a projecting straight line having a width corresponding to one pixel, the center of a boundary pixel is used twice in defining an outline. Thus, the width of such a projecting straight line remains corresponding to one pixel even when an image is enlarged or expanded.

SUMMARY OF THE INVENTION

It is an object of this invention to provide an improved method of extracting outline data from bi-level image data.

It is another object of this invention to provide an improved apparatus for extracting outline data from bi-level image data.

A first aspect of this invention provides a method of extracting an outline of a first-level region from a bi-level image which is represented by an array of pixels, the method comprising the steps of generating code words representing outline tracing directions which are defined at points between the pixels respectively; determining the outline tracing directions represented by the code words in accordance with states of the pixels surrounding and adjoining the related points respectively; performing a movement from one of the points to another being one of neighboring points in accordance with the outline tracing direction represented by the code word defined at said one of the points; repeating said movement-performing step to trace an outline of a region in the bi-level image; and generating data representing said traced outline in accordance with addresses of the points along which said movements are performed.

A second aspect of this invention provides an apparatus for extracting an outline of a first-level region from a bi-level image which is represented by an array of pixels, the apparatus comprising means for generating code words representing outline tracing directions which are defined at points between the pixels respectively; means for determining the outline tracing directions represented by the code words in accordance with states of the pixels surrounding and adjoining the related points respectively; means for performing a movement from one of the points to another being one of neighboring points In accordance with the outline tracing direction represented by the code word defined at said one of the points; means for repeating said movement-performing to trace an outline of a region in the bi-level image; and means for generating data representing said traced outline in accordance with addresses of the points along which said movements are performed.

DESCRIPTION OF THE FIRST PREFERRED EMBODIMENT

Figure 1:
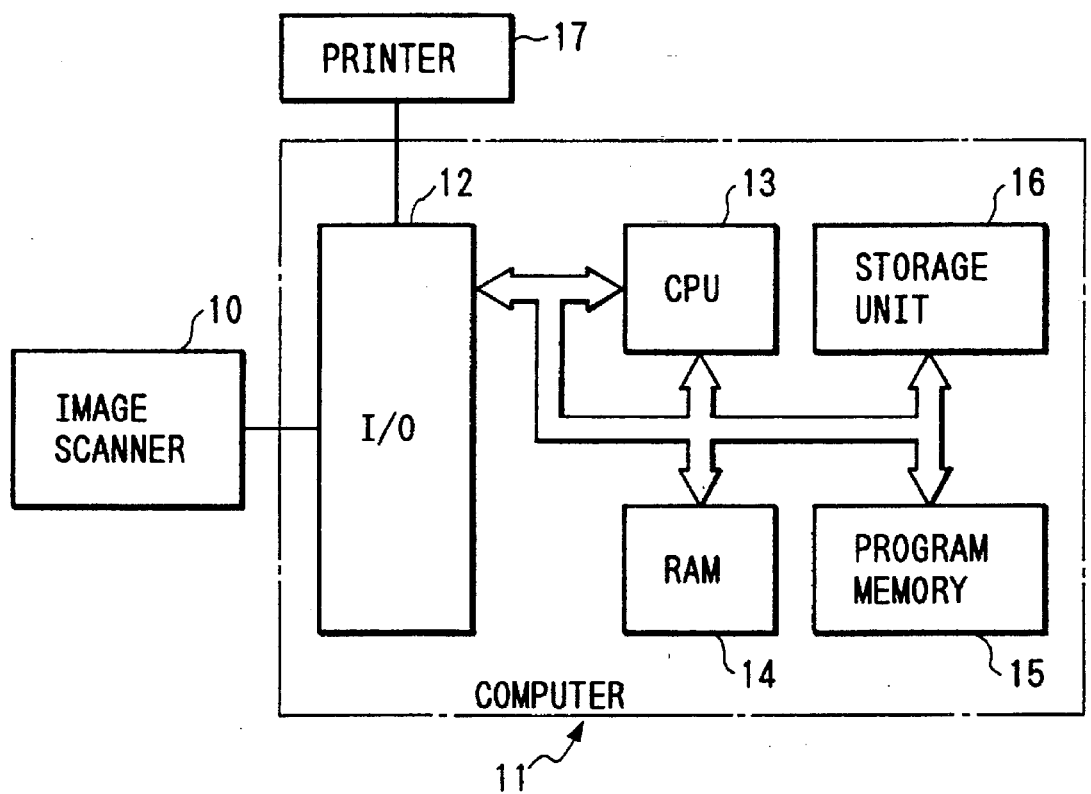
FIG. 1 is a block diagram of an outline extracting apparatus according to a first embodiment of this invention.

With reference to FIG. 1, an image scanner 10 converts an image of documents into a corresponding image signal. The image scanner 10 outputs the image signal to a computer 11 such as a work station or a personal computer.

The computer 11 includes a combination of an I/O port 12, a CPU 13, a RAM 14, a program memory 15, and a storage unit 16. The I/O port 12 receives the image signal from the image scanner 10. The I/O port 12 includes an A/D converter which converts the received image signal into a corresponding digital image signal (input image data). The computer 11 processes the digital image signal into a second image signal (a processing-resultant image signal) in accordance with a program stored in the program memory 15. The computer 11 outputs the processing-resultant image signal to a printer 17. An image represented by the processing-resultant image signal is printed on a sheet by the printer 17.

Figure 2:
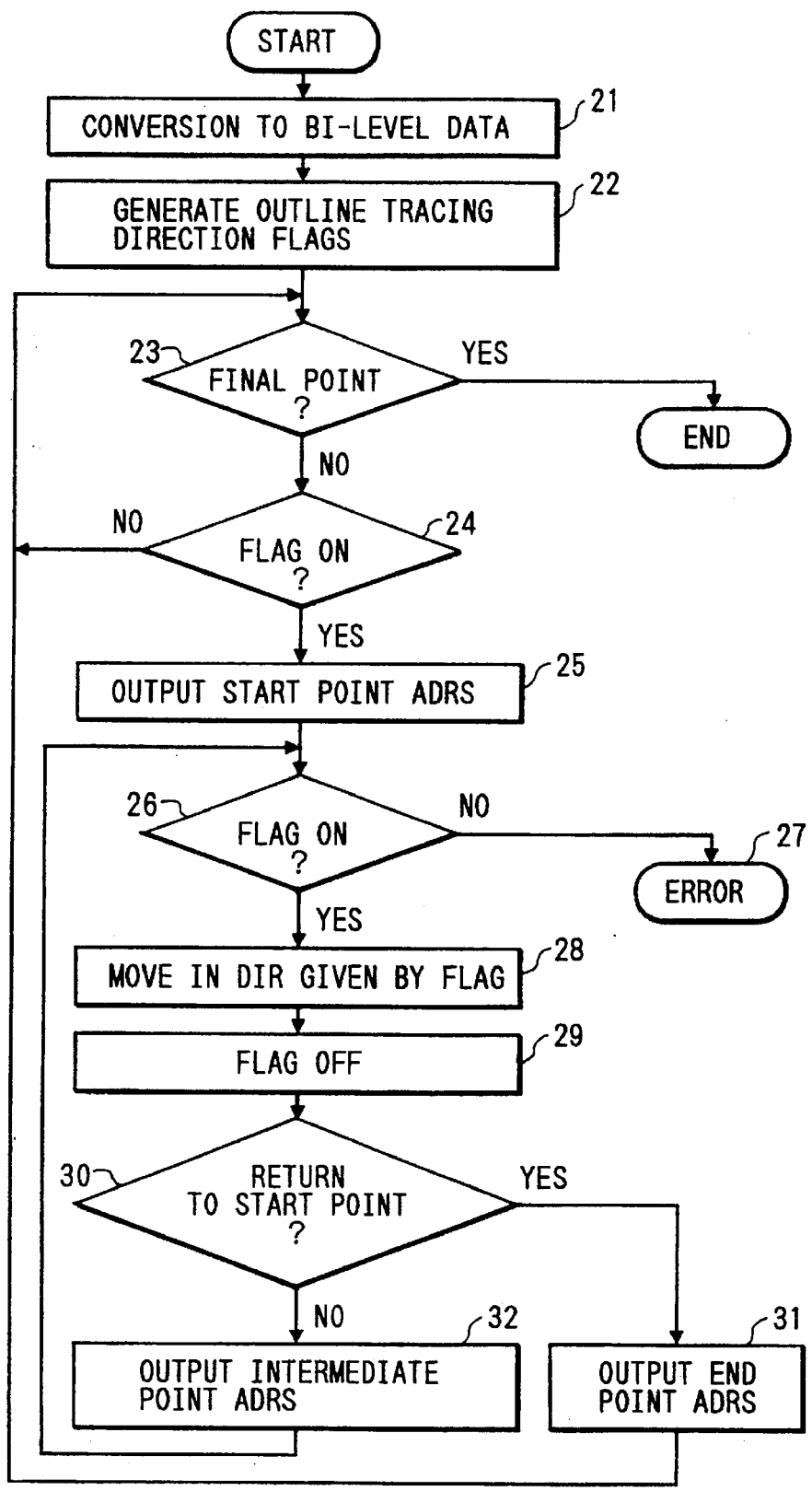
FIG. 2 is a flowchart of a segment of a program operating the computer of FIG. 1.

FIG. 2 is a flowchart of a segment of the program which relates to tracing an outline of a black region in a bi-level (black-white) image. Before the segment of the program is started, the input image data is stored into a bit map data file provided in the storage unit 16 of FIG. 1. With reference to FIG. 2, a first step 21 of the program segment reads out the input image data from the bit map data file and converts the input image data into bi-level image data (black-white image data) by comparing the input image data with a given threshold value. The threshold value corresponds to, for example, an average between white levels and black levels. For each pixel, the bi-level image data includes information representing whether the related pixel corresponds to white or black, and information representing a normal address of the related pixel relative to a frame.

Figures 3, 4:
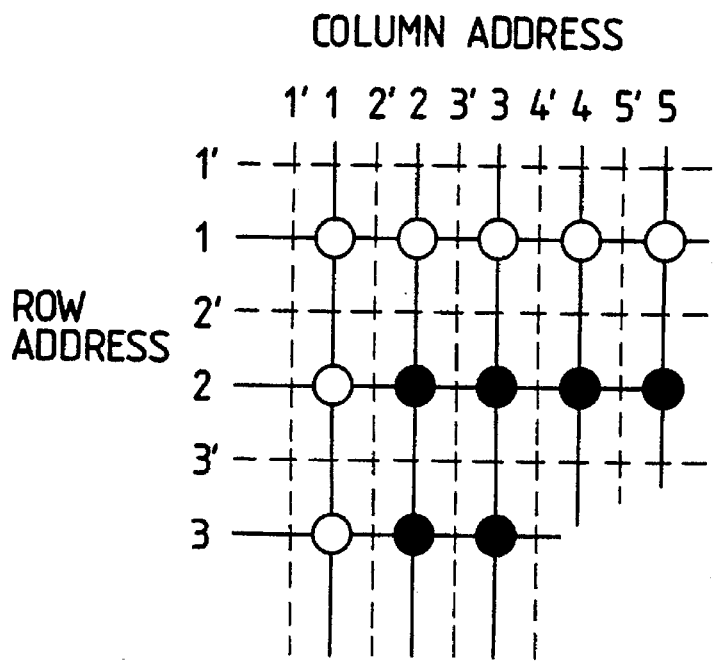
FIG. 3 is a diagram showing addresses used in the apparatus of FIG. 1.
FIG. 4 is a diagram showing a set of outline tracing direction flags generated in the apparatus of FIG. 1.

A step 22 following the step 21 calculates and determines outline tracing direction flags (outline tracing code words) from the bi-level image data. The outline tracing direction flags are stored into the RAM 12 of FIG. 1. In FIG. 3, vertical solid lines denote column normal addresses in a frame respectively, and horizontal solid lines denote row normal addresses in the frame respectively. Points of intersections between the vertical and horizontal solid lines correspond to normal addresses of pixels in the frame respectively. FIG. 3 shows a left-hand upper corner of the frame. In FIG. 3, white circles denote pixels of white states ("0" states), and black circles denote pixels of black states ("1" states).

The operation executed by the step 22 will now be further explained. Offset addresses are introduced. The offset addresses are offset from the normal addresses by a ½ dot interval (a ½ pixel interval). In FIG. 3, vertical broken lines denote column offset addresses in a frame respectively, and horizontal broken lines denote row offset addresses in the frame respectively. Points of intersections between the vertical and horizontal broken lines correspond to points designated by offset addresses respectively. The outline tracing direction flags are defined at the points of the offset addresses respectively. Specifically, the states of four pixels surrounding and adjoining a point of an offset address are used in composing a 4-bit outline tracing direction flag (a 4-bit outline tracing code word) corresponding to the point of the offset address. In other words, each outline tracing direction flag is generated according to the states of four pixels surrounding and adjoining a point of a related offset address.

The points of the offset addresses are given in correspondence with the pixels respectively. The offset addresses have one-to-one correspondence relation with the normal addresses. In FIG. 3, the pixel of a normal address (1, 1) has a white state, that is, "0". Here, the former and latter numerals in the parentheses represent a row normal address and a column normal address respectively. In FIG. 3, the pixel of a normal address (1, 2) has a white state, that is, "0". In addition, the pixel of a normal address (2, 1) has a white state, that is, "0". The pixel of a normal address (2, 2) has a black state, that is, The pixel of a normal address (2, 3) has a black state, that is, "1". The pixel of a normal address (3, 1) has a white state, that is, "0". The pixel of a normal address (3, 2) has a black state, that is, "1".

In FIG. 3, the pixel of a normal address (1, 1) corresponds to the point of an offset address (1', 1'). An outline tracing direction flag defined at the point of an offset address (1', 1') has a state of "0000". In addition, the pixel of a normal address (1, 2) corresponds to the point of an offset address (1', 2'). An outline tracing direction flag defined at the point of an offset address (1', 2') has a state of "0000". The pixel of a normal address (2, 1) corresponds to the point of an offset address (2', 1'). An outline tracing direction flag defined at the point of an offset address (2', 1') has a state of "0000". The pixel of a normal address (2, 2) corresponds to the point of an offset address (2', 2'). An outline tracing direction flag defined at the point of an offset address (2', 2') has a state of "1000". Specifically, the state of the outline tracing direction flag defined at the point of an offset address (2', 2') is determined in accordance with the states of pixels of normal addresses (1, 1), (1, 2), (2, 1), and (2, 2) which surround the point of an offset address (2', 2'). The pixel of a normal address (2, 3) corresponds to the point of an offset address (2', 3'). An outline tracing direction flag defined at the point of an offset address (2', 3') has a state of "1000". Specifically, the state of the outline tracing direction flag defined at the point of an offset address (2', 3') is determined in accordance with the states of pixels of normal addresses (1, 2), (1, 3), (2, 2), and (2, 3) which surround the point of an offset address (2', 3'). The pixel of a normal address (3, 1) corresponds to the point of an offset address (3', 1'). An outline tracing direction flag defined at the point of an offset address (3', 1') has a state of "0000". The pixel of a normal address (3, 2) corresponds to the point of an offset address (3', 2'). An outline tracing direction flag defined at the point of an offset address (3', 2') has a state of "0100". Specifically, the state of the outline tracing direction flag defined at the point of an offset address (3', 2') is determined in accordance with the states of pixels of normal addresses (2, 1), (2, 2), (3, 1), and (3, 2) which surround the point of an offset address (3', 2').

For a frame, outline tracing direction flags are sequentially generated while the points of offset addresses are sequentially scanned in a manner similar to a line-by-line scanning format. As a result, a set of outline tracing direction flags which corresponds to a frame are generated. FIG. 4 shows a set (a map) of outline tracing direction flags which are generated for the bi-level image data of FIG. 3. The step 22 sequentially stores the outline tracing direction flags into storage locations of the RAM which are designated according to the related offset addresses respectively. Furthermore, by the step 22, the total number of the outline tracing direction flags in a frame is set into a counter-representing variable "K". After the step 22, the program advances to a step 23.

The outline tracing direction flags are scanned line by line, being sequentially checked and processed by a set of steps which follows the step 22.

The step 23 decides whether or not the counter value "K" is equal to zero, that is, whether or not the processing (examination and check) of all the outline tracing direction flags is completed. When the counter value "K" is equal to zero, that is, when the processing of all the outline tracing direction flags is completed, the current execution cycle of the segment of the program ends. When the counter value "K" is different from zero, that is, when the processing of all the outline tracing direction flags is not completed, the program advances to a step 24.

The step 24 checks whether or not at least one of bits of a currently-processed outline tracing direction flag is "1". When all the bits of the currently-processed outline tracing direction flag are "0", the step 24 decrements the counter value "K" by one to enable the processing of a next outline tracing direction flag and then the program returns to the step 23. When at least one of bits of the currently-processed outline tracing direction flag is "1", the program advances from the step 24 to a step 25.

The step 25 defines the point of the offset address, which corresponds to the currently-processed outline tracing direction flag, as a point at which tracing will be started. The step 25 outputs the offset address of the starting point, and stores the starting-point offset address into an outline point data file provided in the storage unit 16. After the step 25, the program advances to a step 26.

The step 26 checks whether or not at least one of bits of the outline tracing direction flag is "1". When all the bits of the outline tracing direction flag are "0", the program advances to an error processing routine 27. When at least one of bits of the outline tracing direction flag is "1", the program advances to a step 28.

The step 28 examines and detects the type of the outline tracing direction flag, and executes a movement to an adjacent outline tracing direction flag (a next outline tracing direction flag) on the flag map in a direction determined by the detected type. This movement enables the currently-processed outline tracing direction flag to be updated to or replaced by a next flag in a step 30 and later steps. A step 29 following the step 28 resets the movement-direction representing bit of the outline tracing direction flag to "0".

A step 30 following the step 29 decides whether or not the offset address related to the outline tracing direction flag (the next outline tracing direction flag) is equal to the offset address corresponding to the starting point, that is, whether or not a return to the starting point occurs. When the offset address related to the outline tracing direction flag (the next outline tracing direction flag) is equal to the offset address corresponding to the starting point, that is, when a return to the starting point occurs, the program advances to a step 31. When the offset address related to the outline tracing direction flag (the next outline tracing direction flag) is different from the offset address corresponding to the starting point, that is, when a return to the starting point does not occur, the program advances to a step 32.

The step 31 defines the point of the offset address, which corresponds to the outline tracing direction flag immediately preceding the starting-point flag, as a point at which tracing ends. The step 31 outputs the offset address of the ending point, and stores the ending-pint offset address into the outline point data file. In addition, the step 31 decrements the counter value "K" by one. After the step 31, the program returns to the step 23 to find a next starting point.

The step 32 defines the point of the offset address, which corresponds to the outline tracing direction flag (the next outline tracing flag), as an intermediate point via which tracing will be continued. The step 32 outputs the offset address of the intermediate point, and stores the intermediate-point offset address into the outline data file. After the step 32, the program returns to the step 26.

When all the outline tracing direction flags on the RAM 14 have been checked, the offset addresses of points on the outline or outlines (the outline point data) are present in the outline point data file on the storage unit 16. Bending points on the outline or outlines are detected on the basis of the outline point data in a known way. Vector data representing location information and direction information is generated from the bending points in a known way. The processing-resultant image signal is generated on the basis of the vector data. The processing-resultant image signal is outputted from the computer 11 to the printer 17 so that an image represented by the processing-resultant image signal is printed on a sheet by the printer 17.

Figure 5:
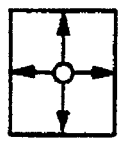
FIG. 5 is a diagram showing the different outline tracing directions represented by an outline tracing direction flag used in the apparatus of FIG. 1.

This embodiment will be further described hereinafter. As described previously, a 4-bit outline tracing direction flag (a 4-bit outline tracing code word) is defined on each point at which the corners of four adjacent square pixels meet. Each outline tracing direction flag represents a direction or directions of tracing. As shown by the arrows of FIG. 5, there are four different tracing directions, that is, "up", "left", "down", and "right". The four bits of each outline tracing direction flag are allotted to indications of four different tracing directions respectively.

Figure 6:
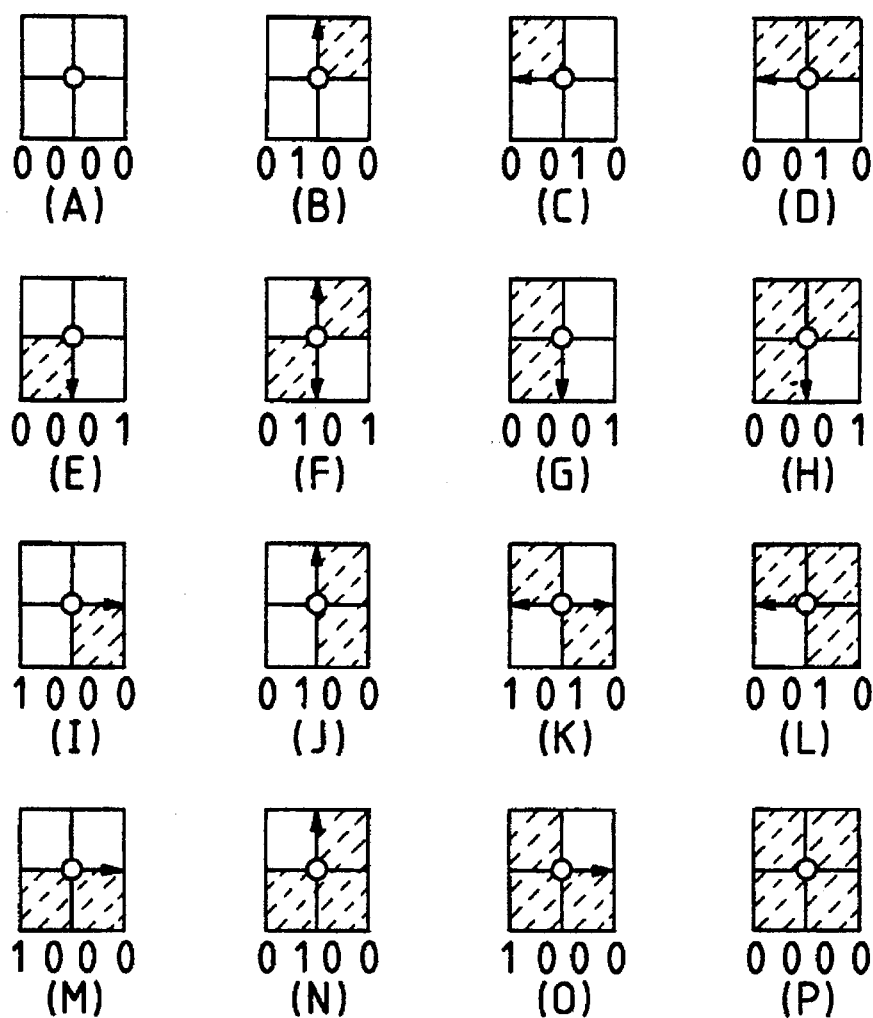
FIG. 6 is a diagram showing the relation between the state of an outline tracing direction flag and the states of pixels surrounding and adjoining a point at which the outline tracing direction flag is defined.

The state of an outline tracing direction flag is determined in accordance with the states of four related pixels. There are 16 different types in the states of four adjacent pixels. The parts (A) to (P) of FIG. 6 show the 16 different states of four adjacent pixels respectively, and show the states of related outline tracing direction flags respectively. As shown in the part (A) of FIG. 6, when four related pixels are white, an outline tracing direction flag is "0000" representing the absence of a tracing direction. As shown in the part (B) of FIG. 6, when a right upper pixel is black and other pixels are white, an outline tracing direction flag is "0100" representing a tracing direction "up". As shown in the part (C) of FIG. 6, when a left upper pixel is black and other pixels are white, an outline tracing direction flag is "0010" representing a tracing direction "left". As shown in the part (D) of FIG. 6, when upper pixels are black and lower pixels are white, an outline tracing direction flag is "0010" representing a tracing direction "left". As shown in the part (E) of FIG. 6, when a left lower pixel is black and other pixels are white, an outline tracing direction flag is "0001" representing a tracing direction "down". As shown in the part (F) of FIG. 6, when a right upper pixel and a left lower pixel are black and other pixels are white, an outline tracing direction flag is "0101" representing tracing directions "up" and "down". As shown in the part (G) of FIG. 6, when left pixels are black and right pixels are white, an outline tracing direction flag is "0001" representing a tracing direction "down". As shown in the part (H) of FIG. 6, when a right lower pixel is white and other pixels are black, an outline tracing direction flag is "0001" representing a tracing direction "down". As shown in the part (I) of FIG. 6, when a right lower pixel is black and other pixels are white, an outline tracing direction flag is "1000" representing a tracing direction "right". As shown in the part (J) of FIG. 6, when left pixels are white and right pixels are black, an outline tracing direction flag is "0100" representing a tracing direction "up". As shown in the part (K) of FIG. 6, when a left upper pixel and a right lower pixel are black and other pixels are white, an outline tracing direction flag is "1010" representing tracing directions "left" and "right". As shown in the part (L) of FIG. 6, when a left lower pixel is white and other pixels are black, an outline tracing direction flag is "0010" representing a tracing direction "left". As shown in the part (M) of FIG. 6, when lower pixels are black and upper pixels are white, an outline tracing direction flag is "1000" representing a tracing direction "right". As shown in the part (N) of FIG. 6, when a left upper pixel is white and other pixels are black, an outline tracing direction flag is "0100" representing a tracing direction "up". As shown in the part (O) of FIG. 6, when a right upper pixel is white and other pixels are black, an outline tracing direction flag is "1000" representing a tracing direction "right". As shown in the part (P) of FIG. 6, when four related pixels are black, an outline tracing direction flag is "0000" representing the absence of a tracing direction.

Figure 7:
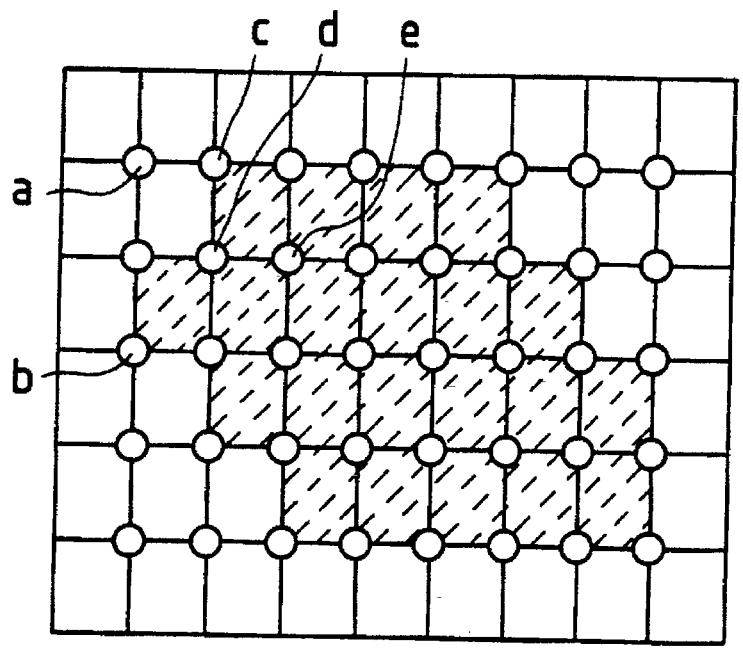
FIG. 7 is a diagram showing a first example of a bi-level image.

FIG. 7 shows an example of a bi-level image represented by an array of square pixels. In FIG. 7, the circles denote points at which outline tracing direction flags are defined respectively. For example, an outline tracing direction flag at a point "a" is "0000" which corresponds to the part (A) of FIG. 6. An outline tracing direction flag at a point "b" is "0100" which corresponds to the part (B) of FIG. 6. An outline tracing direction flag at a point "c" is "1000" which corresponds to the part (I) of FIG. 6. An outline tracing direction flag at a point "d" is "0100" which corresponds to the part (N) of FIG. 6. An outline tracing direction flag at a point "e" is "0000" which corresponds to the part (P) of FIG. 6.

Figure 8:
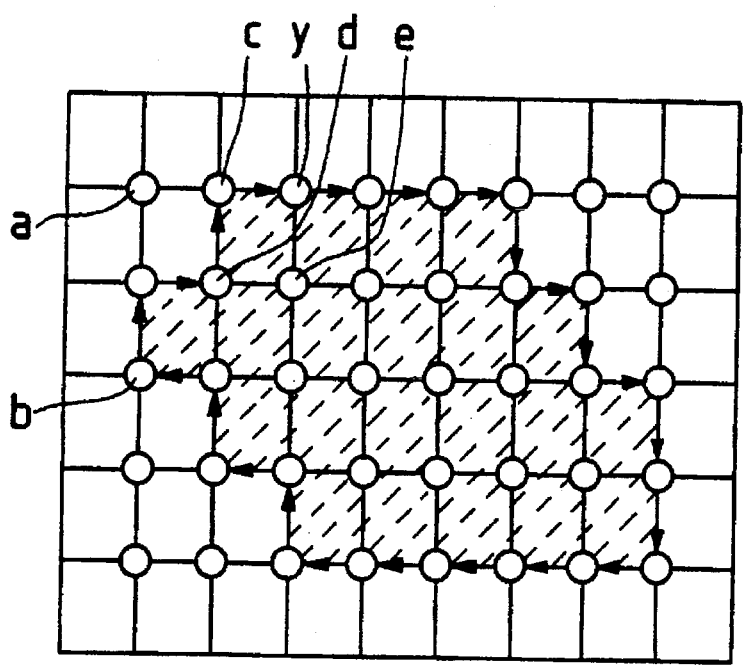
FIG. 8 is a diagram showing a traced outline of a black region in the bi-level image of FIG. 7.

A description will now be given of tracing executed in connection with the bi-level image of FIG. 7. After all the outline tracing direction flags are generated, points related to outline tracing direction flags different from "0000" are searched. As described previously, one of points related to outline tracing direction flags different from "0000" is used as a starting point. As shown in FIG. 8, tracing is started from the starting point to a next point in a direction represented by the outline tracing direction flag related to the starting point, and then the bit of the outline tracing direction flag of the starting point which represents the tracing direction is reset to "0". After the next point is defined as a current point, tracing is advanced from the current point to a next point in a direction represented by the outline tracing direction flag related to the current point. Then, the bit of the outline tracing direction flag of the current point which represents the tracing direction is reset to "0". Such processes are reiterated. For example, in FIG. 8, the point "d" relates to a tracing direction "up", and thus tracing is advanced from the point "d" to a point "c". Then, the outline tracing direction flag at the point "d" is reset from "0100" to "0000". The point "c" relates to a tracing direction "right", and thus tracing is advanced from the point "c" to a point "y". Then, the outline tracing direction flag at the point "c" is reset from "1000" to "0000". In this way, each time tracing is advanced by one step, the direction-representing bit of the outline tracing direction flag of the current point is reset to "0". The tracing processes are reiterated until all the outline tracing direction flags are reset to "0000". When all the outline tracing direction flags are rest to "0000", the outline of a black region or the outlines of black regions in the image are detected.

Figure 9:
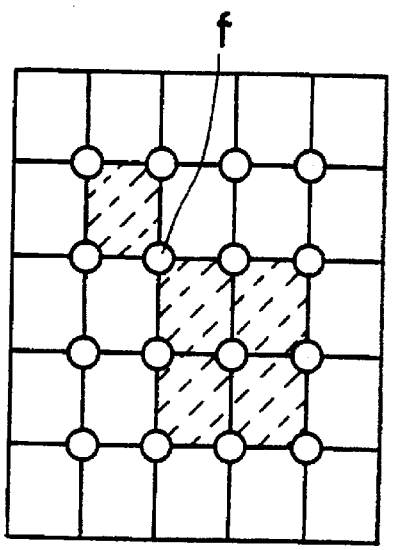
FIG. 9 is a diagram showing a second example of a bi-level image.
Figure 11:
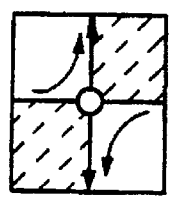
FIGS. 11 to 14 are diagrams showing the states of outline tracing direction flags representing two tracing directions, and directions along which actual tracing is done.
Figure 12:
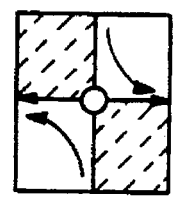
Figure 13:
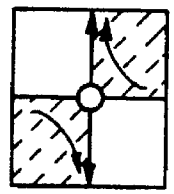
Figure 14:
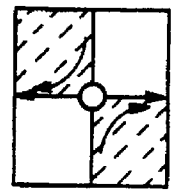

FIG. 9 shows another example of a bi-level image represented by an array of square pixels. In FIG. 9, the circles denote points at which outline tracing direction flags are defined respectively. For example, an outline tracing direction flag at a point "f" is "1010" which corresponds to the part (K) of FIG. 6. A similar-type outline tracing direction flag which assumes a state of "0101" is shown in the part (F) of FIG. 6. At such special points, tracing is executed in accordance with counterclockwise movement as shown in FIGS. 11 and 12, or with clockwise movement as shown in FIGS. 13 and 14. When the counterclockwise movement is selected, the outlines result in two loops connecting at the point "f" with each other. On the other hand, when the clockwise movement is selected, the outlines result in a single loop. It is dependent on user's selection which to choose. For example, where the outlines so executed are applied to Chinese character recognition, the clockwise movement is preferable because it is reasonable to handle a connecting pattern as a whole.

Figure 10:
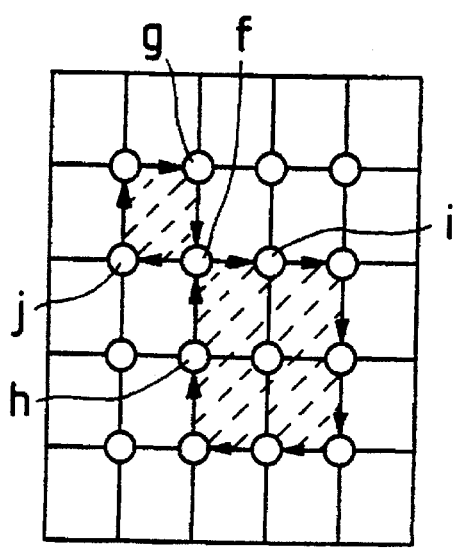
FIG. 10 is a diagram showing traced outlines of black regions in the bi-level image of FIG. 9.

A description will now be given of tracing executed in connection with the bi-level image of FIG. 9. After all the outline tracing direction flags are generated, points related to outline tracing direction flags different from "0000" are searched. As described previously, one of points related to outline tracing direction flags different from "0000" is used as a starting point. Tracing is started from the starting point to a next point in a direction represented by the outline tracing direction flag related to the starting point, and then the bit of the outline tracing direction flag of the starting point which represents the tracing direction is reset to "0". After the next point is defined as a current point, tracing is advanced from the current point to a next point in a direction represented by the outline tracing direction flag related to the current point. Then, the bit of the outline tracing direction flag of the current point which represents the tracing direction is reset to "0". Such processes are reiterated. For example, in FIG. 10, the point "g" relates to a tracing direction "down", and thus tracing is advanced from the point "g" to a point "f". Then, the outline tracing direction flag at the point "g" is reset from "0001" to "0000". The point "f" relates to tracing directions "right" and "left". The tracing direction "left", that is, the counterclockwise movement, is selected at the point "f" first. Thus, tracing is advanced from the point "f" to a point "i". Then, the outline tracing direction flag at the point "f" is changed from "1010" to "0010". During a later state, tracing is advanced from a point "h" to the point "f". In this case, since the outline tracing direction flag at the point "f" is "0010", tracing is successively advanced from the point "f" to a point "j". Then, the outline tracing direction flag at the point "f" is reset from "0010" to "0000". In this way, each time tracing is advanced by one step, the direction-representing bit of the outline tracing direction flag of the current point is reset to "0". The tracing processes are reiterated until all the outline tracing direction flags are reset to "0000". When all the outline tracing direction flags are rest to "0000", the outline of a black region or the outlines of black regions in the image are detected.

According to a modification of this embodiment, at points related to outline tracing direction flags of "0101" and "1010", tracing is executed in accordance with clockwise movement as shown in FIGS. 13 and 14. In the modification of this embodiment, after tracing is advanced from the point "g" to the point "f", the tracing direction "right" (the clockwise movement) is selected at the point "f" first. Thus, tracing is advanced from the point "f" to the point "j". Then, the outline tracing direction flag at the point "f" is changed from "1010" to "1000". During a later state, tracing is advanced from a point "h" to the point "f". In this case, since the outline tracing direction flag at the point "f" is "1000", tracing is successively advanced from the point "f" to a point "i". Then, the outline tracing direction flag at the point "f" is reset from "1000" to "0000".

Figure 15:
FIG. 15 is an illustration of a third example of a bi-level image.
Figure 16:
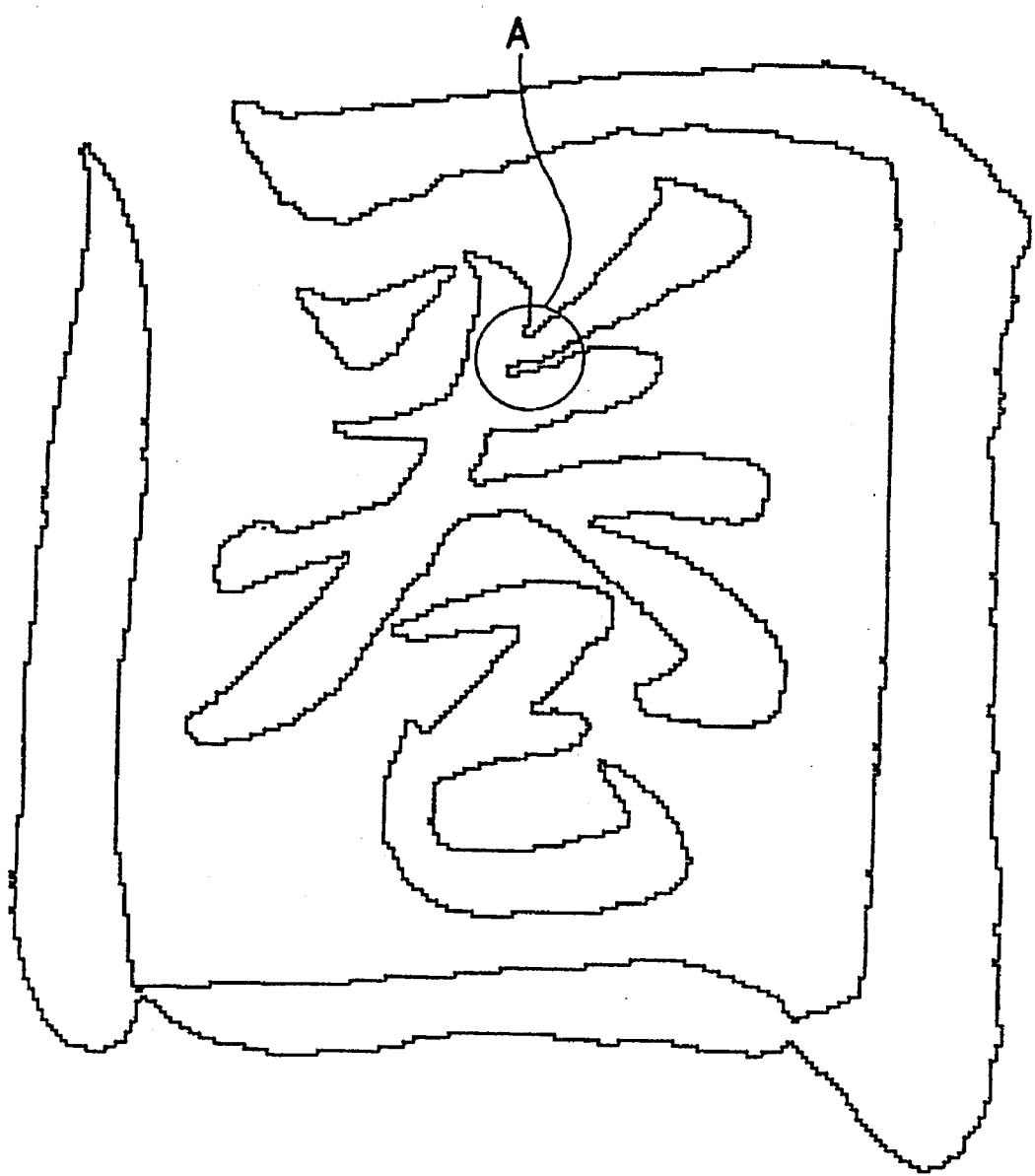
FIG. 16 is a diagram showing traced outlines of white regions (traced outlines of a black region) in the bi-level image of FIG. 15.
Figure 17:
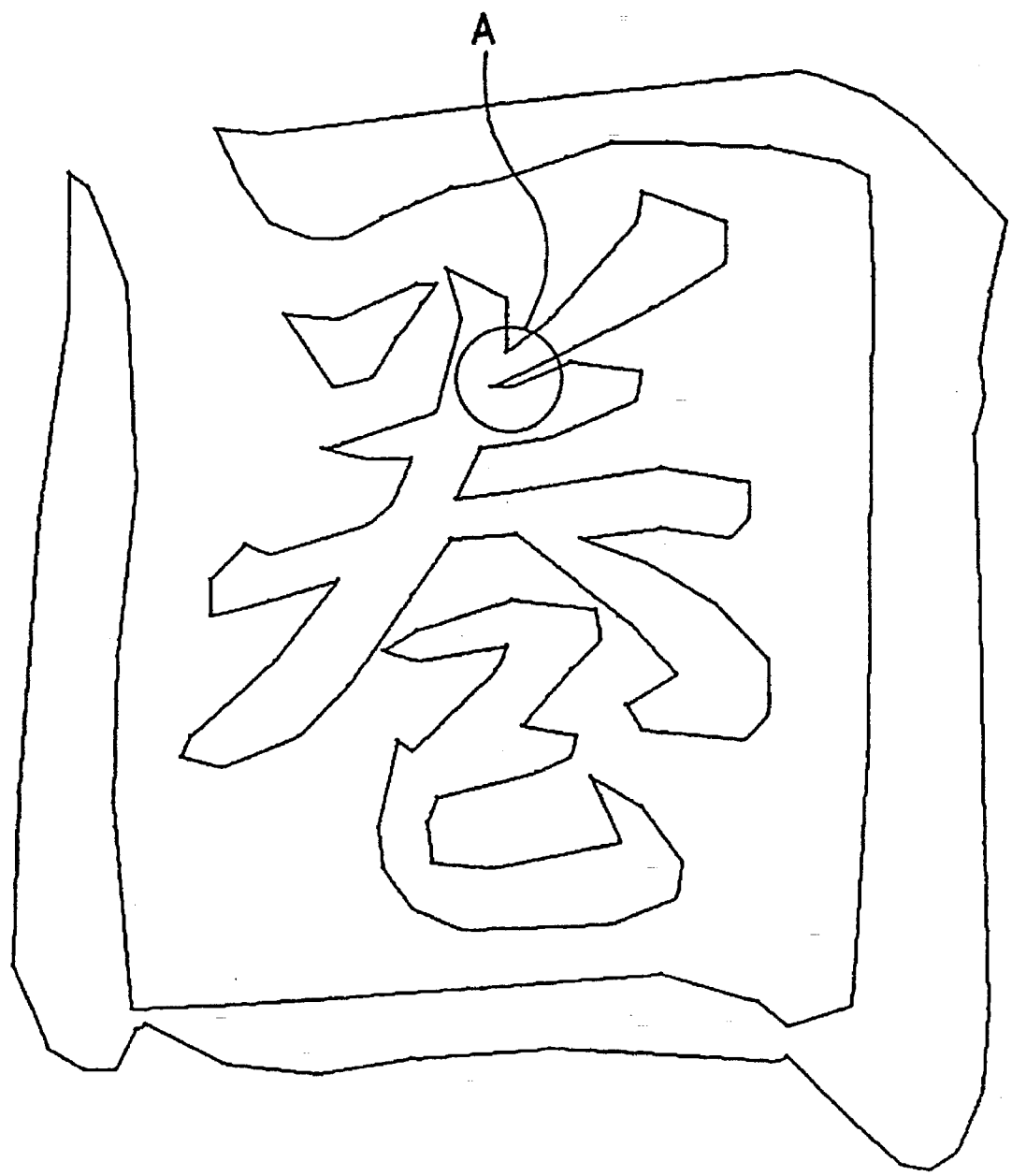
FIG. 17 is an illustration of smoothed outlines corresponding to the outlines of FIG. 16 which are generated by using vector data.

FIG. 15 shows an example of an actual bi-level image. FIG. 16 shows the outlines of a black region (the outlines of white regions) in the bi-level image of FIG. 15 which are traced according to this embodiment. FIG. 17 shows the outlines of a black region (the outlines of white regions) which are represented by vector data generated on the basis of the outline data related to FIG. 16.

Figure 18:
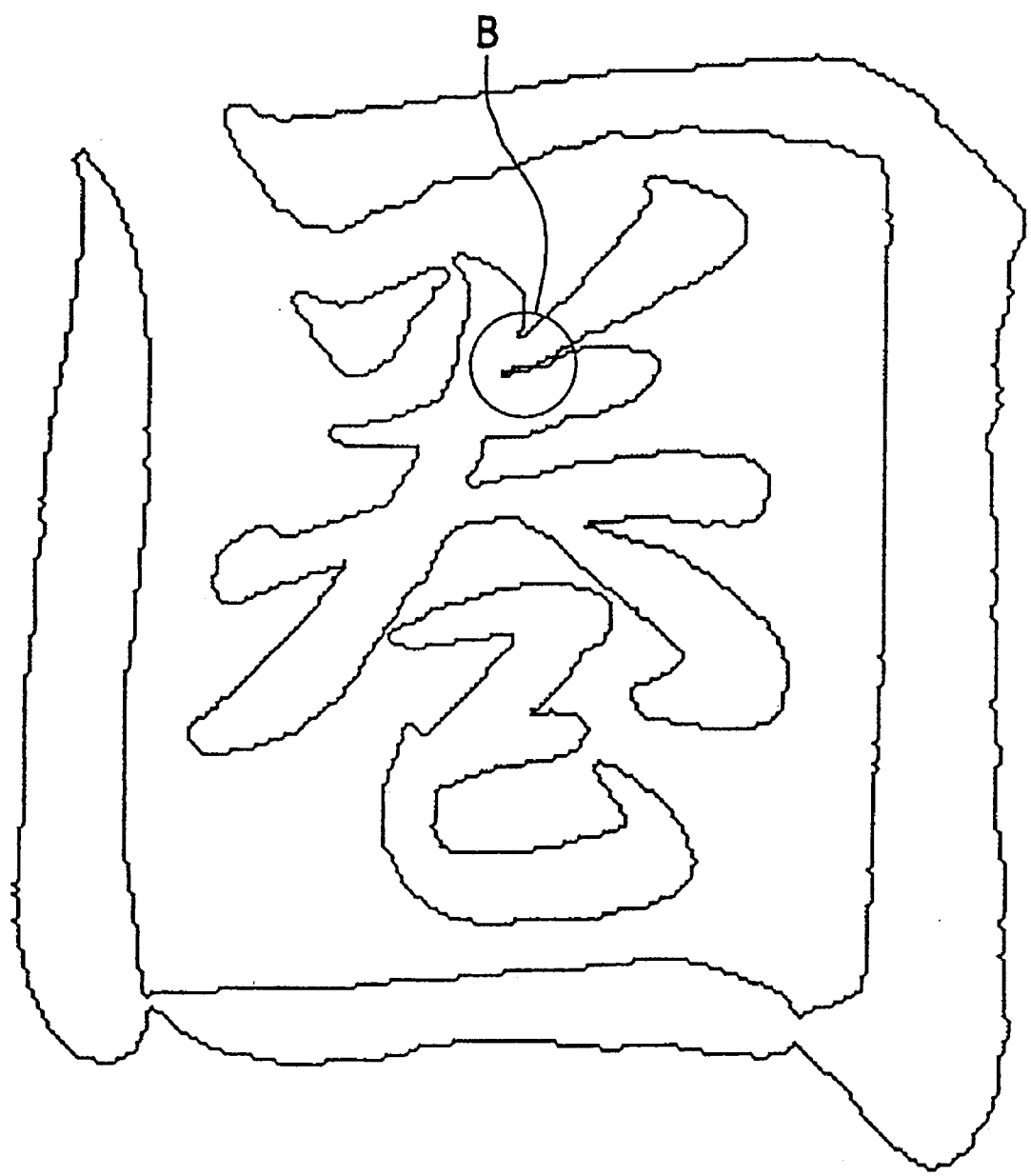
FIG. 18 is a diagram showing traced outlines of white regions (traced outlines of a black region) in the bi-level image of FIG. 15 which are generated according to a prior-art method.
Figure 19:
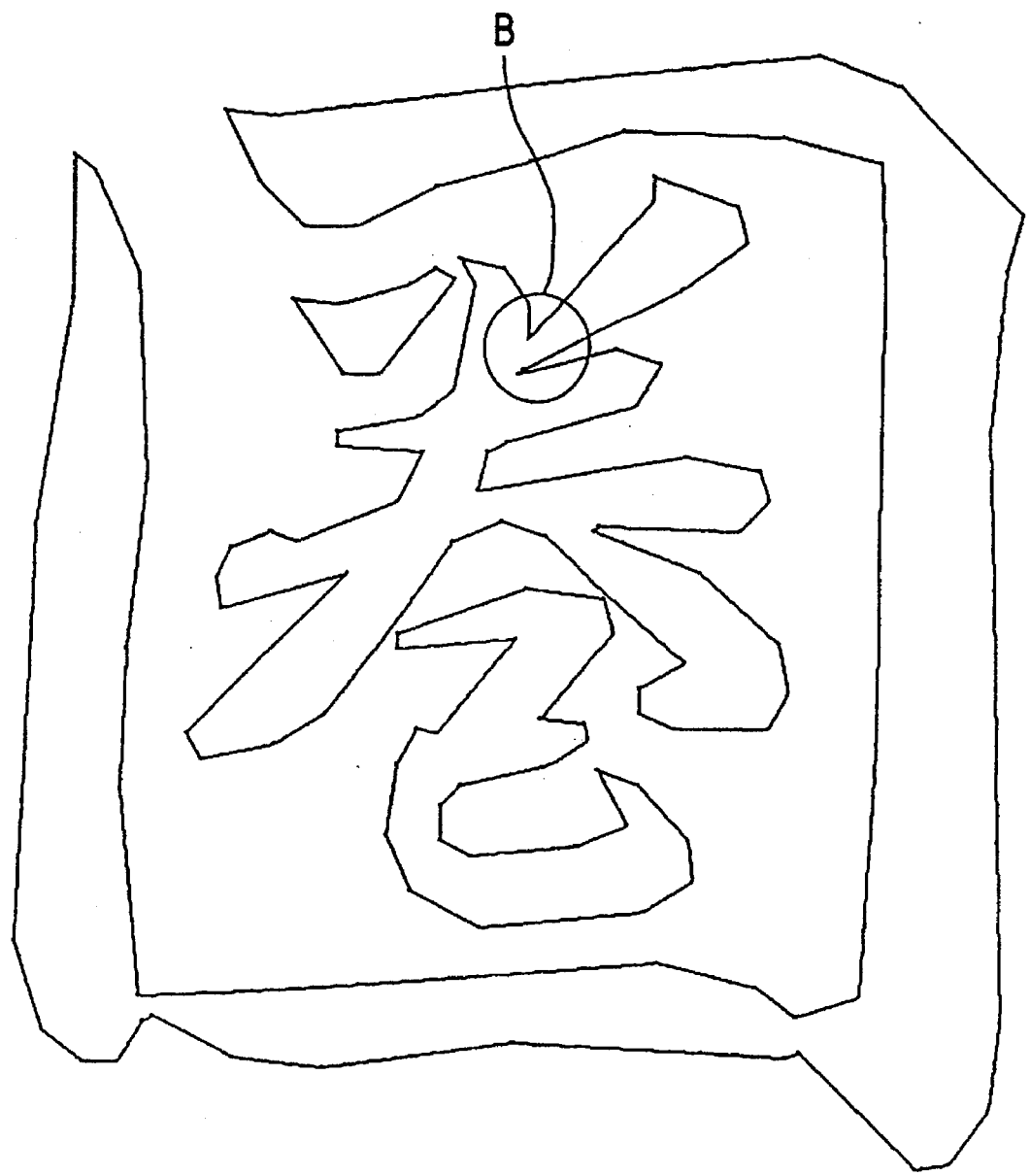
FIG. 19 is an illustration of smoothed outlines corresponding to the outlines of FIG. 18 which are generated by using vector data.

FIG. 18 shows the outlines of a black region (the outlines of white regions) in the bi-level image of FIG. 15 which are traced according to the prior-art method. FIG. 19 shows the outlines of a black region (the outlines of white regions) which are represented by vector data generated on the basis of the outline data related to FIG. 18.

As described previously, in this invention, an outline is traced by using points on the boundary between a white region and a black region. Thus, according to this embodiment, the traced outlines in FIG. 16 are essentially equal to the outlines in the original image of FIG. 15. In the prior-art method, an outline is traced by using the centers of edge black pixels. Thus, according to the prior-art method, the traced outlines in FIG. 18 are somewhat different from the outlines in the original image of FIG. 15. An advantage of this embodiment can be made clear by comparing the conditions of a region "A" of FIG. 16 and the conditions of a corresponding region "B" of FIG. 18.

In addition, this embodiment has the following advantages. Since an outline is traced by referring to tracing directions given by outline tracing direction flags, reiteration of search for a tracing direction is unnecessary and thus the time spent in data processing is relatively short. Since it is unnecessary to expand input bi-level image data twice in each of vertical and horizontal directions, this embodiment dispenses with a large-capacity memory and the data processing time is relatively short.

DESCRIPTION OF THE SECOND PREFERRED EMBODIMENT

A second embodiment of this invention is similar to the first embodiment except for an addition design which will be explained hereinafter.

An outline tracing code (an outline tracing direction flag) is introduced. A tracing direction "right" (an outline tracing direction flag of "1000") is defined as an outline tracing code word of "0" in decimal notation. A tracing direction "up" (an outline tracing direction flag of "0100") is defined as an outline tracing code word of "1" in decimal notation. A tracing direction "left" (an outline tracing direction flag of "0010") is defined as an outline tracing code word of "2" in decimal notation. A tracing direction "down" (an outline tracing direction flag of "0001") is defined as an outline tracing code word of "3" in decimal notation.

Figure 20:
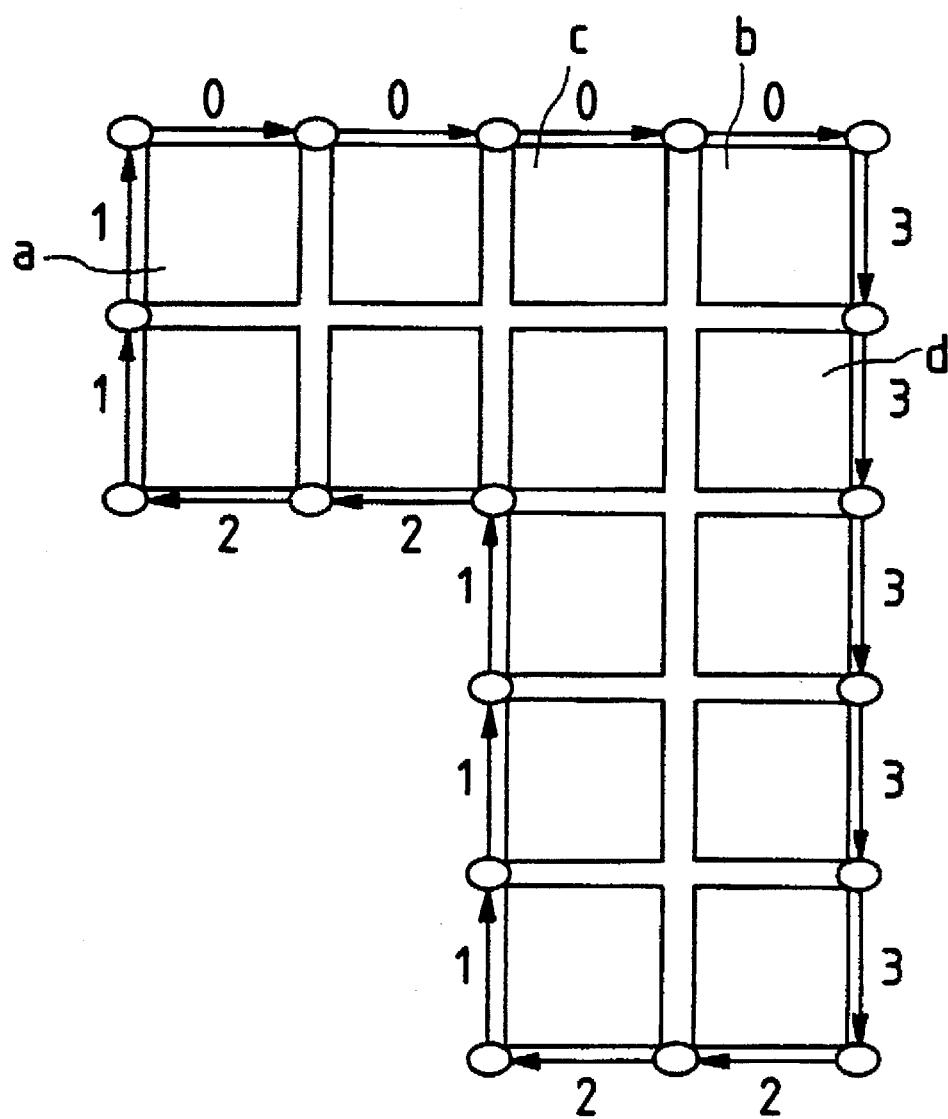
FIG. 20 is a diagram showing a traced outline of a black region which is generated according to a second embodiment of this invention.

In the case of a bi-level image having a black region of FIG. 20, when tracing is started from a point "a", a sequence of outline tracing code words is given as "0000333332221112211". A succession of equal outline tracing code words corresponds to a straight part of an outline. Efficient data processing is enabled by omitting such straight-line data and by generating vector data only from outline tracing data corresponding to points at which outline tracing code words change.

If a corner pixel "b" in FIG. 20 lacks, neighboring pixels "c" and "d" will change in outline tracing code words so that a lager quantity of vector data will be generated. This embodiment has a faction of recovering such a lost pixel.

FIGS. 21 to 24 show four different types of the loss of a corner pixel from a block of 3 by 3 black pixels. FIGS. 25 to 28 show sequences of outline tracing code words which are obtained in the cases of FIGS. 21 to 24 respectively.

Figure 21:
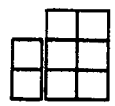
FIGS. 21 to 24 are diagrams showing four different types of the loss of a corner pixel from a block of 3 by 3 black pixels.
Figure 25:
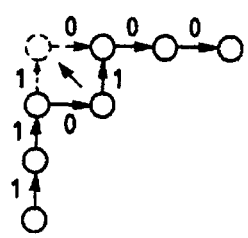
FIGS. 25 to 28 are diagrams showing sequences of outline tracing code words corresponding to the pixel blocks of FIGS. 21 to 24 respectively.
Figure 29:
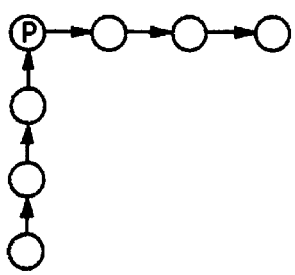
FIGS. 29 to 32 are diagrams showing corrected sequences of outline tracing code words corresponding to the code word sequences of FIGS. 25 to 28 respectively.

Specifically, FIG. 21 shows the loss of a left upper corner pixel from a block of 3 by 3 black pixels. In this case, as shown in FIG. 25, a portion of a sequence of outline tracing code words is given as "110100". The pixel corresponding to the lost corner pixel is now defined as a black pixel, and the fourth point corresponding to an outline code word of "1" is replaced by a new point which is distant from the fourth point upwardly by a 1-pixel interval and leftwardly by a 1-pixel interval. This replacement changes a portion of a sequence of outline tracing code words from "110100" to "111000". In more detail, a reference table storing a code word sequence "110100" is previously provided. When a code word sequence "110100" is detected by referring to this reference table, the lost black pixel is recovered and the previously-mentioned replacement of points is executed. Thus, the code word sequence is changed from "110100" to "111000". With reference to FIG. 29, the corner of the recovered pixel is used as a bending point "P" in generating vector data.

Figure 22:
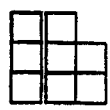
Figure 26:
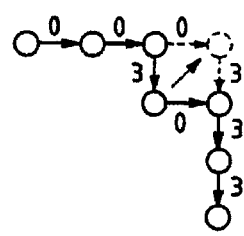
Figure 30:
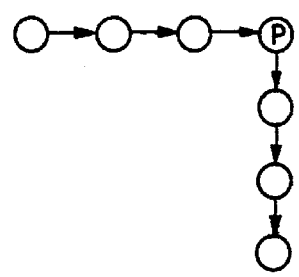

FIG. 22 shows the loss of a right upper corner pixel from a block of 3 by 3 black pixels. In this case, as shown in FIG. 26, a portion of a sequence of outline tracing code words is given as "003033". The pixel corresponding to the lost corner pixel is now defined as a black pixel, and the fourth point corresponding to an outline code word of "0" is replaced by a new point which is distant from the fourth point upwardly by a 1-pixel interval and rightwardly by a 1-pixel interval. This replacement changes a portion of a sequence of outline tracing code words from "003033" to "000333". In more detail, a reference table storing a code word sequence "003033" is previously provided. When a code word sequence "003033" is detected by referring to this reference table, the lost pixel is recovered and the previously-mentioned replacement of points is executed. Thus, the code word sequence is changed from "003033" to "000333". With reference to FIG. 30, the corner of the recovered pixel is used as a bending point "P" in generating vector data.

Figure 23:
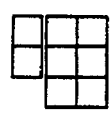
Figure 27:
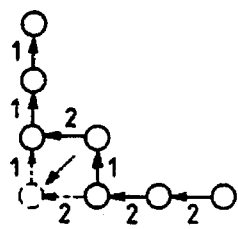
Figure 31:
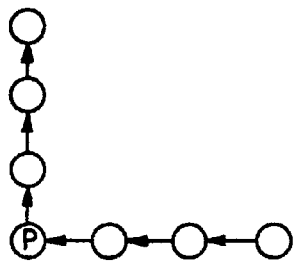

FIG. 23 shows the loss of a left lower corner pixel from a block of 3 by 3 black pixels. In this case, as shown in FIG. 27, a portion of a sequence of outline tracing code words is given as "221211". The pixel corresponding to the lost corner pixel is now defined as a black pixel, and the fourth point corresponding to an outline code word of "2" is replaced by a new point which is distant from the fourth point downwardly by a 1-pixel interval and leftwardly by a 1-pixel interval. This replacement changes a portion of a sequence of outline tracing code words from "221211" to "222111". In more detail, a reference table storing a code word sequence "221211" is previously provided. When a code word sequence "221211" is detected by referring to this reference table, the lost pixel is recovered and the previously-mentioned replacement of points is executed. Thus, the code word sequence is changed from "221211" to "222111". With reference to FIG. 31, the corner of the recovered pixel is used as a bending point "P" in generating vector data.

Figure 24:
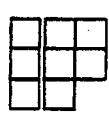
Figure 28:
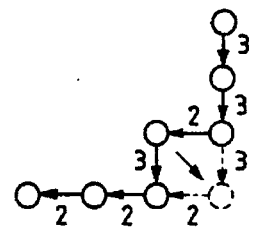
Figure 32:
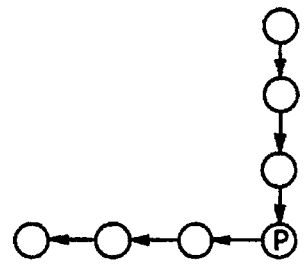

FIG. 24 shows the loss of a right lower corner pixel from a block of 3 by 3 black pixels. In this case, as shown in FIG. 28, a portion of a sequence of outline tracing code words is given as "332322". The pixel corresponding to the lost corner pixel is now defined as a black pixel, and the fourth point corresponding to an outline code word of "3" is replaced by a new point which is distant from the fourth point downwardly by a 1-pixel interval and rightwardly by a 1-pixel interval. This replacement changes a portion of a sequence of outline tracing code words from "332322" to "333222". In more detail, a reference table storing a code word sequence "332322" is previously provided. When a code word sequence "332322" is detected by referring to this reference table, the lost pixel is recovered and the previously-mentioned replacement of points is executed. Thus, the code word sequence is changed from "332322" to "333222". With reference to FIG. 32, the corner of the recovered pixel is used as a bending point "P" in generating vector data.

FIGS. 33 to 36 show four different types of the loss of a corner pixel from a block of 4 by 4 black pixels. FIGS. 37 to 40 show sequences of outline tracing code words which are obtained in the cases of FIGS. 33 to 36 respectively.

Figure 33:
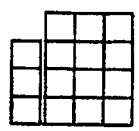
FIGS. 33 to 36 are diagrams showing four different types of the loss of a corner pixel from a block of 4 by 4 black pixels.
Figure 37:
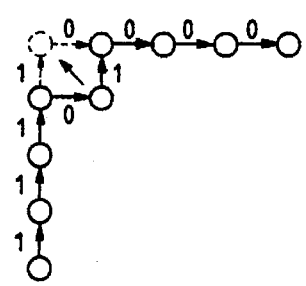
FIGS. 37 to 40 are diagrams showing sequences of outline tracing code words corresponding to the pixel blocks of FIGS. 33 to 36 respectively.

Specifically, FIG. 33 shows the loss of a left upper corner pixel from a block of 4 by 4 black pixels. In this case, as shown in FIG. 37, a portion of a sequence of outline tracing code words is given as "11101000". The pixel corresponding to the lost corner pixel is now defined as a black pixel, and the fifth point corresponding to an outline code word of "1" is replaced by a new point which is distant from the fifth point upwardly by a 1-pixel interval and leftwardly by a 1-pixel interval. This replacement changes a portion of a sequence of outline tracing code words from "11101000" to "11110000". In more detail, a reference table storing a code word sequence "11101000" is previously provided. When a code word sequence "11101000" is detected by referring to this reference table, the lost black pixel is recovered and the previously-mentioned replacement of points is executed. Thus, the code word sequence is changed from "11101000" to "11110000". The corner of the recovered pixel is used as a bending point in generating vector data.

Figure 34:
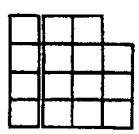
Figure 38:
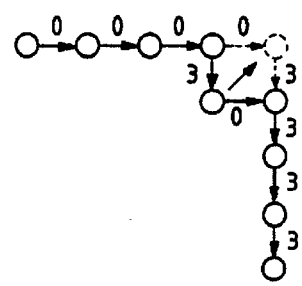

FIG. 34 shows the loss of a right upper corner pixel from a block of 4 by 4 black pixels. In this case, as shown in FIG. 38, a portion of a sequence of outline tracing code words is given as "00030333". The pixel corresponding to the lost corner pixel is now defined as a black pixel, and the fifth point corresponding to an outline code word of "0" is replaced by a new point which is distant from the fifth point upwardly by a 1-pixel interval and rightwardly by a 1-pixel interval. This replacement changes a portion of a sequence of outline tracing code words from "00030333" to "00003333". In more detail, a reference table storing a code word sequence "00030333" is previously provided. When a code word sequence "00030333" is detected by referring to this reference table, the lost pixel is recovered and the previously-mentioned replacement of points is executed. Thus, the code word sequence is changed from "00030333" to "00003333". The corner of the recovered pixel is used as a bending point in generating vector data.

Figure 35:
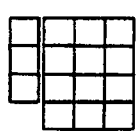
Figure 39:
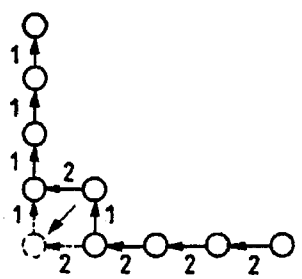

FIG. 35 shows the loss of a left lower corner pixel from a block of 4 by 4 black pixels. In this case, as shown in FIG. 39, a portion of a sequence of outline tracing code words is given as "22212111". The pixel corresponding to the lost corner pixel is now defined as a black pixel, and the fifth point corresponding to an outline code word of "2" is replaced by a new point which is distant from the fifth point downwardly by a 1-pixel interval and leftwardly by a 1-pixel interval. This replacement changes a portion of a sequence of outline tracing code words from "22212111" to "22221111". In more detail, a reference table storing a code word sequence "22212111" is previously provided. When a code word sequence "22212111" is detected by referring to this reference table, the lost pixel is recovered and the previously-mentioned replacement of points is executed. Thus, the code word sequence is changed from "22212111" to "22221111". The corner of the recovered pixel is used as a bending point in generating vector data.

Figure 36:
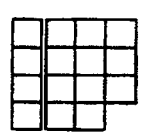
Figure 40:
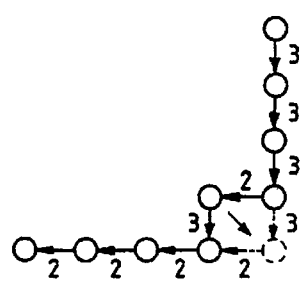

FIG. 36 shows the loss of a right lower corner pixel from a block of 4 by 4 black pixels. In this case, as shown in FIG. 40, a portion of a sequence of outline tracing code words is given as "33323222". The pixel corresponding to the lost corner pixel is now defined as a black pixel, and the fifth point corresponding to an outline code word of "3" is replaced by a new point which is distant from the fifth point downwardly by a 1-pixel interval and rightwardly by a 1-pixel interval. This replacement changes a portion of a sequence of outline tracing code words from "3323222" to "3332222". In more detail, a reference table storing a code word sequence "3323222" is previously provided. When a code word sequence "3323222" is detected by referring to this reference table, the lost pixel is recovered and the previously-mentioned replacement of points is executed. Thus, the code word sequence is changed from "3323222" to "3332222". The corner of the recovered pixel is used as a bending point in generating vector data.

FIGS. 41 to 44 show four different types of the loss of two adjacent corner pixels from a block of 5 by 4 black pixels. FIGS. 45 to 48 show sequences of outline tracing code words which are obtained in the cases of FIGS. 41 to 44 respectively.

Figure 41:
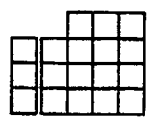
FIGS. 41 to 44 are diagrams showing four different types of the loss of two adjacent corner pixels from a block of 5 by 4 black pixels.
Figure 45:
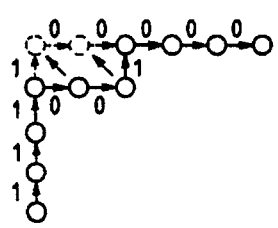
FIGS. 45 to 48 are diagrams showing sequences of outline tracing code words corresponding to the pixel blocks of FIGS. 41 to 44 respectively.
Figure 53:
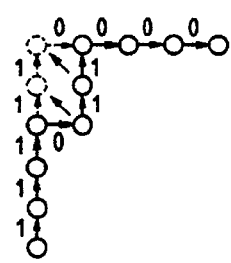
FIGS. 53 to 56 are diagrams showing sequences of outline tracing code words corresponding to the pixel blocks of FIGS. 49 to 52 respectively.
Figure 46:
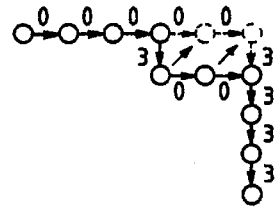
Figure 54:
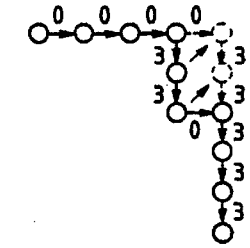

Specifically, FIG. 41 shows the loss of two adjacent left upper corner pixels from a block of 5 by 4 black pixels. In this case, as shown in FIG. 45, a portion of a sequence of outline tracing code words is given as "111001000". The pixels corresponding to the lost corner pixels are now defined as black pixels, and the fifth point corresponding to an outline code word of "0" is replaced by a new point which is distant from the fifth point upwardly by a 1-pixel interval and leftwardly by a 1-pixel interval. In addition, the sixth point corresponding to an outline code word of "1" is replaced by a new point which is distant from the sixth point upwardly by a 1-pixel interval and leftwardly by a 1-pixel interval. These replacements change a portion of a sequence of outline tracing code words from "111001000" to "111100000". In more detail, a reference table storing a code word sequence "111001000" is previously provided. When a code word sequence "111001000" is detected by referring to this reference table, the lost black pixels are recovered and the previously-mentioned replacements of points are executed. Thus, the code word sequence is changed from "111001000" to "111100000". The corner of the recovered pixel which coincides with the corner of a block of 5 by 4 black pixels is used as a bending point in generating vector data.

Figure 42:
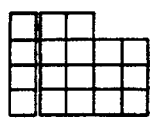

FIG. 42 shows the loss of two adjacent right upper corner pixels from a block of 5 by 4 black pixels. In this case, as shown in FIG. 36, a portion of a sequence of outline tracing code words is given as "000300333". The pixels corresponding to the lost corner pixels are now defined as black pixels, and the fifth point corresponding to an outline code word of "0" is replaced by a new point which is distant from the fifth point upwardly by a 1-pixel interval and rightwardly by a 1-pixel interval. In addition, the sixth point corresponding to an outline code word of "0" is replaced by a new point which is distant from the sixth point upwardly by a 1-pixel interval and rightwardly by a 1-pixel interval. These replacements change a portion of a sequence of outline tracing code words from "000300333" to "000003333". In more detail, a reference table storing a code word sequence "000300333" is previously provided. When a code word sequence "000300333" is detected by referring to this reference table, the lost pixels are recovered and the previously-mentioned replacements of points are executed. Thus, the code word sequence is changed from "000300333" to "000003333". The corner of the recovered pixel which coincides with the corner of a block of 5 by 4 black pixels is used as a bending point in generating vector data.

Figure 43:
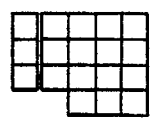
Figure 47:
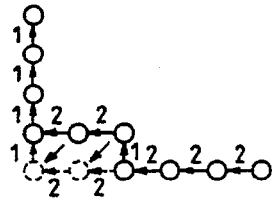
Figure 55:
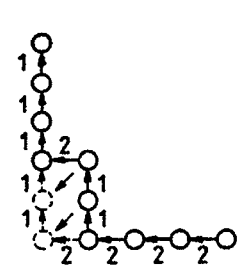

FIG. 43 shows the loss of two adjacent left lower corner pixels from a block of 5 by 4 black pixels. In this case, as shown in FIG. 47, a portion of a sequence of outline tracing code words is given as "222122111". The pixels corresponding to the lost corner pixels are now defined as black pixels, and the fifth point corresponding to an outline code word of "2" is replaced by a new point which is distant from the fifth point downwardly by a 1-pixel interval and leftwardly by a 1-pixel interval. In addition, the sixth point corresponding to an outline code word of "2" is replaced by a new point which is distant from the sixth point downwardly by a 1-pixel interval and leftwardly by a 1-pixel interval. These replacements change a portion of a sequence of outline tracing code words from "222122111" to "222221111". In more detail, a reference table storing a code word sequence "222122111" is previously provided. When a code word sequence "222122111" is detected by referring to this reference table, the lost pixels are recovered and the previously-mentioned replacements of points are executed. Thus, the code word sequence is changed from "222122111" to "222221111". The corner of the recovered pixel which coincides with the corner of a block of 5 by 4 black pixels is used as a bending point in generating vector data.

Figure 44:
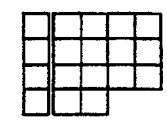
Figure 49:
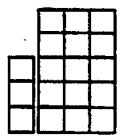
FIGS. 49 to 52 are diagrams showing four different types of the loss of two adjacent corner pixels from a block of 4 by 5 black pixels.
Figure 50:
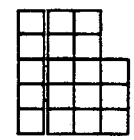
Figure 51:
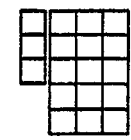
Figure 52:
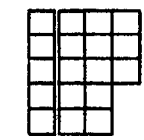
Figure 48:
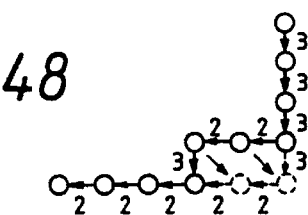
Figure 56:
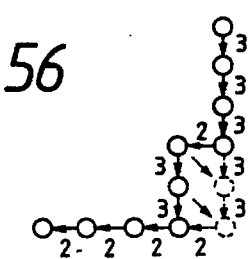

FIG. 44 shows the loss of two adjacent right lower corner pixels from a block of 5 by 4 black pixels. In this case, as shown in FIG. 48, a portion of a sequence of outline tracing code words is given as "33223222". The pixels corresponding to the lost corner pixels are now defined as black pixels, and the fifth point corresponding to an outline code word of "2" is replaced by a new point which is distant from the fifth point downwardly by a 1-pixel interval and rightwardly by a 1-pixel interval. In addition, the sixth point corresponding to an outline code word of "3" is replaced by a new point which is distant from the sixth point downwardly by a 1-pixel interval and rightwardly by a 1-pixel interval. These replacements change a portion of a sequence of outline tracing code words from "33223222" to "33322222". In more detail, a reference table storing a code word sequence "33223222" is previously provided. When a code word sequence "33223222" is detected by referring to this reference table, the lost pixels are recovered and the previously-mentioned replacements of points are executed. Thus, the code word sequence is changed from "33223222" to "33322222". The corner of the recovered pixel which coincides with the corner of a block of 5 by 4 black pixels is used as a bending point in generating vector data.

FIGS. 49 to 52 show four different types of the loss of two adjacent corner pixels from a block of 4 by 5 black pixels. FIGS. 53 to 56 show sequences of outline tracing code words which are obtained in the cases of FIGS. 49 to 52 respectively. Two adjacent corner pixels are recovered and a code word sequence is corrected in respect of FIGS. 49–56 as in the case of a block of 5 by 4 black pixels.

FIGS. 57 to 60 show four different types of the loss of three adjacent corner pixels from a block of 5 by 5 black pixels. FIGS. 61 to 64 show sequences of outline tracing code words which are obtained in the cases of FIGS. 57 to 60 respectively.

Figure 57:
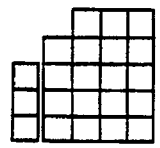
FIGS. 57 to 60 are diagrams showing four different types of the loss of three adjacent corner pixels from a block of 5 by 5 black pixels.
Figure 61:
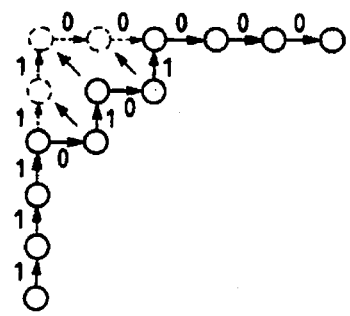
FIGS. 61 to 64 are diagrams showing sequences of outline tracing code words corresponding to the pixel blocks of FIGS. 57 to 60 respectively.

Specifically, FIG. 57 shows the loss of three adjacent left upper corner pixels from a block of 5 by 5 black pixels. In this case, as shown in FIG. 61, a portion of a sequence of outline tracing code words is given as "1110101000". The pixels corresponding to the lost corner pixels are now defined as black pixels, and the fifth point corresponding to an outline code word of "1" is replaced by a new point which is distant from the fifth point upwardly by a 1-pixel interval and leftwardly by a 1-pixel interval. In addition, the sixth point corresponding to an outline code word of "0" is replaced by a new point which is distant from the sixth point upwardly by a 1-pixel interval and leftwardly by a 1-pixel interval. Furthermore, the seventh point corresponding to an outline code word of "1" is replaced by a new point which is distant from the seventh point upwardly by a 1-pixel interval and leftwardly by a 1-pixel interval. These replacements change a portion of a sequence of outline tracing code words from "1110101000" to "1111100000". In more detail, a reference table storing a code word sequence "1110101000" is previously provided. When a code word sequence "1110101000" is detected by referring to this reference table, the lost black pixels are recovered and the previously-mentioned replacements of points are executed. Thus, the code word sequence is changed from "1110101000" to "1111100000". The corner of the recovered pixel which coincides with the corner of a block of 5 by 5 black pixels is used as a bending point in generating vector data.

Figure 58:
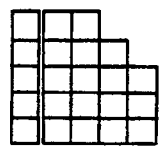
Figure 62:
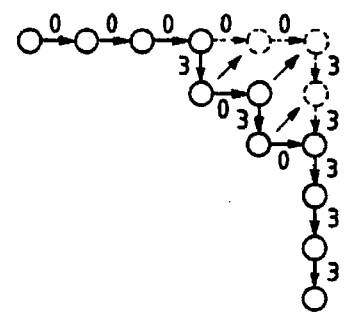

FIG. 58 shows the loss of three adjacent right upper corner pixels from a block of 5 by 5 black pixels. In this case, as shown in FIG. 62, a portion of a sequence of outline tracing code words is given as "0003030333". The pixels corresponding to the lost corner pixels are now defined as black pixels, and the fifth point corresponding to an outline code word of "0" is replaced by a new point which is distant from the fifth point upwardly by a 1-pixel interval and rightwardly by a 1-pixel interval. In addition, the sixth point corresponding to an outline code word of "3" is replaced by a new point which is distant from the sixth point upwardly by a 1-pixel interval and rightwardly by a 1-pixel interval. Furthermore, the seventh point corresponding to an outline code word of "0" is replaced by a new point which is distant from the seventh point upwardly by a 1-pixel interval and rightwardly by a 1-pixel interval. These replacements change a portion of a sequence of outline tracing code words from "0003030333" to "0000033333". In more detail, a reference table storing a code word sequence "0003030333" is previously provided. When a code word sequence "0003030333" is detected by referring to this reference table, the lost pixels are recovered and the previously-mentioned replacements of points are executed. Thus, the code word sequence is changed from "0003030333" to "0000033333". The corner of the recovered pixel which coincides with the corner of a block of 5 by 5 black pixels is used as a bending point in generating vector data.

Figure 59:
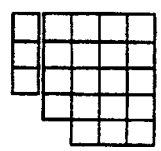
Figure 63:
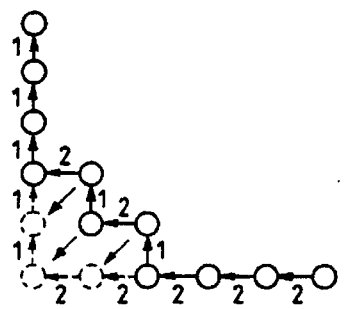

FIG. 59 shows the loss of three adjacent left lower corner pixels from a block of 5 by 5 black pixels. In this case, as shown in FIG. 63, a portion of a sequence of outline tracing code words is given as "2221212111". The pixels corresponding to the lost corner pixels are now defined as black pixels, and the fifth point corresponding to an outline code word of "2" is replaced by a new point which is distant from the fifth point downwardly by a 1-pixel interval and leftwardly by a 1-pixel interval. In addition, the sixth point corresponding to an outline code word of "1" is replaced by a new point which is distant from the sixth point downwardly by a 1-pixel interval and leftwardly by a 1-pixel interval. Furthermore, the seventh point corresponding to an outline code word of "1" is replaced by a new point which is distant from the seventh point downwardly by a 1-pixel interval and leftwardly by a 1-pixel interval. These replacements change a portion of a sequence of outline tracing code words from "2221212111" to "2222211111". In more detail, a reference table storing a code word sequence "2221212111" is previously provided. When a code word sequence "2221212111" is detected by referring to this reference table, the lost pixels are recovered and the previously-mentioned replacements of points are executed. Thus, the code word sequence is changed from "2221212111" to "2222211111". The corner of the recovered pixel which coincides with the corner of a block of 5 by 5 black pixels is used as a bending point in generating vector data.

Figure 60:
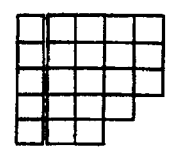
Figure 64:
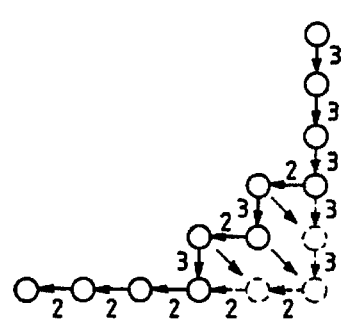

FIG. 60 shows the loss of three adjacent right lower corner pixels from a block of 5 by 5 black pixels. In this case, as shown in FIG. 64, a portion of a sequence of outline tracing code words is given as "332323222". The pixels corresponding to the lost corner pixels are now defined as black pixels, and the fifth point corresponding to an outline code word of "3" is replaced by a new point which is distant from the fifth point downwardly by a 1-pixel interval and rightwardly by a 1-pixel interval. In addition, the sixth point corresponding to an outline code word of "2" is replaced by a new point which is distant from the sixth point downwardly by a 1-pixel interval and rightwardly by a 1-pixel interval. Furthermore, the seventh point corresponding to an outline code word of "3" is replaced by a new point which is distant from the seventh point downwardly by a 1-pixel interval and rightwardly by a 1-pixel interval. These replacements change a portion of a sequence of outline tracing code words from "332323222" to "333322222". In more detail, a reference table storing a code word sequence "332323222" is previously provided. When a code word sequence "332323222" is detected by referring to this reference table, the lost pixels are recovered and the previously-mentioned replacements of points are executed. Thus, the code word sequence is changed from "332323222" to "333322222". The corner of the recovered pixel which coincides with the corner of a block of 5 by 5 black pixels is used as a bending point in generating vector data.

What is claimed is:

1. A method of extracting an outline of a first-level region from a bi-level image which is represented by an array of pixels, the method comprising the steps of:

generating 4-direction code words defined at points between the pixels respectively, wherein each of the 4-direction code words is changeable among seven different states and represents presence and absence of an upward outline tracing direction, a downward outline tracing direction, a leftward outline tracing direction, and a rightward outline tracing direction, said seven different states including a first state representing presence of the upward outline tracing direction and absence of the other outline tracing directions, a second state representing presence of the downward outline tracing direction and absence of the other outline tracing directions, a third state representing presence of the leftward outline tracing direction and absence of the other outline tracing directions, a fourth state representing presence of the rightward outline tracing direction and absence of the other outline tracing directions, a fifth state representing absence of all the outline tracing directions, a sixth state representing presence of both the upward outline tracing direction and the downward outline tracing direction and absence of the other outline tracing directions, and a seventh state representing presence of both the leftward outline tracing direction and the rightward outline tracing direction and absence of the other outline tracing directions;

determining states of the 4-direction code words from among said seven different states in accordance with states of the four pixels surrounding and adjoining the related points respectively;

wherein a state of each of the 4-direction code words is determined to be one of the sixth state and the seventh state when a first pair of opposite pixels of the four pixels are in a first one of the bi-levels and a second pair of opposite pixels of the four pixels are in a second one of the bi-levels;

performing a movement from one of the points to a neighboring point thereof in accordance with the state of the 4-direction code word defined at said one of the points, wherein:

said upward outline tracing direction and downward outline tracing direction start from a same point and are oppositely directed to each other, and said leftward outline tracing direction and rightward outline tracing direction start from a common point and are oppositely directed to each other;

said movement-performing step includes:

selecting one of the oppositely directed upward outline tracing direction and downward outline tracing direction from a same point when the state of the 4-direction code word is the sixth state, performing a movement from one of the points being considered as said same point to a neighboring point thereof in accordance with said selected one of the oppositely directed upward outline tracing direction and downward outline tracing direction from said one of the points, selecting one of the oppositely directed leftward outline tracing direction and rightward outline tracing direction from a common point when the state of the 4-direction code word is the seventh state, and performing a movement from one of the points being considered as said common point to a neighboring point thereof in accordance with said selected one of the oppositely directed leftward outline tracing direction and rightward outline tracing direction from said one of the points;

repeating said movement-performing step to trace an outline of a region in the bi-level image; and generating data representing said traced outline in accordance with addresses of the points along which said movements are performed.

2. The method of claim 1, further comprising the step of correcting a corner of said traced outline.

3. The method of claim 1, further comprising the step of sharpening a corner of said traced outline.

4. An apparatus for extracting an outline of a first-level region from a bi-level image which is represented by an array of pixels, the apparatus comprising:

means for generating 4-direction code words defined at points between the pixels respectively, wherein each of the 4-direction code words is changeable among seven different states and represents presence and absence of an upward outline tracing direction, a downward outline tracing direction, a leftward outline tracing direction, and a rightward outline tracing direction, said seven different states including a first state representing presence of the upward outline tracing direction and absence of the other outline tracing directions, a second state representing presence of the downward outline tracing direction and absence of the other outline tracing directions, a third state representing presence of the leftward outline tracing direction and absence of the other outline tracing directions, a fourth state representing presence of the rightward outline tracing direction and absence of the other outline tracing directions, a fifth state representing absence of all the outline tracing directions, a sixth state representing presence of both the upward outline tracing direction and the downward outline tracing direction and absence of the other outline tracing directions, and a seventh state representing presence of both the leftward outline tracing direction and the rightward outline tracing direction and absence of the other outline tracing directions;

means for determining states of the 4-direction code words from among said seven different states in accordance with states of the four pixels surrounding and adjoining the related points respectively, wherein a state of each of the 4-direction code words is determined to be one of the sixth state and the seventh state when a first pair of opposite pixels of the four pixels are in a first one of the bi-levels and a second pair of opposite pixels of the four pixels are in a second one of the bi-levels;

means for performing a movement from one of the points to a neighboring point in accordance with the state of the 4-direction code word defined at said one of the points, wherein:

said upward outline tracing direction and downward outline tracing direction start from a same point and are oppositely directed to each other, and said leftward outline tracing direction and rightward outline tracing direction start from a common point and are oppositely directed to each other;

said movement-performing means includes:

means for selecting one of the oppositely directed upward outline tracing direction and downward outline tracing direction from a same point when the state of the 4-direction code word is the sixth state, means for performing a movement from one of the points being considered as said same point to a neighboring point thereof in accordance with said selected one of the oppositely directed upward outline tracing direction and downward outline tracing direction from said one of the points, means for selecting one of the oppositely directed leftward outline tracing direction and rightward outline tracing direction from a common point when the state of the 4-direction code word is the seventh state, and means for performing a movement from one of the points being considered as said common point to a neighboring point thereof in accordance with said selected one of the oppositely directed leftward outline tracing direction and rightward outline tracing direction from said one of the points;

means for repeating said movement-performing to trace an outline of a region in the bi-level image; and means for generating data representing said traced outline in accordance with addresses of the points along which said movements are performed.

5. The apparatus of claim 4, further comprising means for correcting a corner of said traced outline.

6. The apparatus of claim 4, further comprising means for sharpening a corner of said traced outline.

7. The method of claim 1, further comprising the step of correcting a corner of said traced outline in response to a sequence of the 4-direction code words which corresponds to said traced outline.

8. The method of claim 1, further comprising the step of sharpening a corner of said traced outline in response to a sequence of the 4-direction code words which corresponds to said traced outline.

9. The apparatus of claim 4, further comprising means for correcting a corner of said traced outline in response to a sequence of the 4-direction code words which corresponds to said traced outline.

10. The apparatus of claim 4, further comprising means for sharpening a corner of said traced outline in response to a sequence of the 4-direction code words which corresponds to said traced outline.

11. The method of claim 1, wherein said step of determining states of the 4-direction code words comprises the step of:

determining said state of a 4-direction code word to be in one of said sixth state and said seventh state only upon determining a presence in said four pixels surrounding and adjoining the related points of a pair of diagonally opposing pixels in said first one of the bi-levels as said first pair of opposite pixels and upon determining a presence in said four pixels surrounding and adjoining the related points of another pair of diagonally opposing pixels in said second one of the bi-levels as said second pair of opposite pixels.

12. The apparatus of claim 4, wherein said means for determining states of the 4-direction code words comprises dual-direction-state determining means for determining said state of a 4-direction code word to be in one of said sixth state and said seventh state only upon determining a presence in said four pixels surrounding and adjoining the related points of a pair of diagonally opposing pixels in said first one of the bi-levels as said first pair of opposite pixels and upon determining a presence in said four pixels surrounding and adjoining the related points of another pair of diagonally opposing pixels in said second one of the bi-levels as said second pair of opposite pixels.

13. The method of claim 1, wherein said bi-level image indicates a hand-written Chinese character, and said step of generating data comprises generating data representing said traced outline of a region in the hand-written Chinese character.

14. The apparatus of claim 4, wherein said bi-level image indicates a hand-written Chinese character, and said means for generating data comprises means for generating data representing said traced outline of a region in the hand-written Chinese character.

15. The method of claim 1, wherein said step of determining states of the 4-direction code words comprises the step of:

determining said state of a 4-direction code word to be one of said sixth state and said seventh state only upon determining that, of said four pixels surrounding and adjoining the related points:

a) said first pair of opposite pixels in said first one of the bi-levels is one pair of diagonally opposing pixels, and b) said second pair of opposite pixels in said second one of the bi-levels is a different pair of diagonally opposing pixels.

16. The apparatus of claim 4, wherein said means for determining states of the 4-direction code words comprises dual-direction-state determining means for determining said state of a 4-direction code word to be one of said sixth state and said seventh state only upon determining that, of said four pixels surrounding and adjoining the related points:

a) said first pair of opposite pixels in said first one of the bi-levels is one pair of diagonally opposing pixels, and b) said second pair of opposite pixels in said second one of the bi-levels is a different pair of diagonally opposing pixels.

17. The method of claim 1, wherein said step of determining states of the 4-direction code words comprises identifying the states of all of the four pixels surrounding and adjoining the related points, and determining the states of the 4-direction code words in accordance with the states of all of the four pixels surrounding and adjoining the related points.

18. The apparatus of claim 4, wherein said means for determining states of the 4-direction code words comprises first means for identifying the states of all of the four pixels surrounding and adjoining the related points, and second means responsive to said first means for determining the states of the 4-direction code words in accordance with the states of all of the four pixels surrounding and adjoining the related points.

* * * * *